(12) United States Patent
Kim et al.

(10) Patent No.: US 8,673,468 B2
(45) Date of Patent: Mar. 18, 2014

(54) RECHARGEABLE BATTERY

(75) Inventors: Yongsam Kim, Yongin-si (KR); Sangwon Byun, Yongin-si (KR); Chiyoung Lee, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 403 days.

(21) Appl. No.: 12/929,309

(22) Filed: Jan. 13, 2011

(65) Prior Publication Data

US 2012/0021259 A1  Jan. 26, 2012

(30) Foreign Application Priority Data

Jul. 22, 2010  (KR) .................. 10-2010-0070809

(51) Int. Cl.
*H01M 2/12* (2006.01)
(52) U.S. Cl.
USPC ........................................... 429/56
(58) Field of Classification Search
None
See application file for complete search history.

(56) References Cited

U.S. PATENT DOCUMENTS

| 6,571,816 B2 | 6/2003 | Morishita et al. |
| 2003/0131880 A1* | 7/2003 | Marubayashi et al. .... 137/68.27 |
| 2006/0292437 A1 | 12/2006 | Matsumoto et al. |

FOREIGN PATENT DOCUMENTS

| JP | 11250885 A * | 9/1999 |
| JP | 2008-159313 A | 7/2008 |
| JP | 2008159313 A * | 7/2008 |
| KR | 10 2003-0053004 A | 6/2003 |
| KR | 10 2008-0036740 A | 4/2008 |
| KR | 20080036740 A * | 4/2008 |

OTHER PUBLICATIONS

Korean Office Action in KR 10-2010-0070809, dated Sep. 9, 2011 (Kim, et al.).

* cited by examiner

*Primary Examiner* — Ula C Ruddock
*Assistant Examiner* — Daniel Gatewood
(74) *Attorney, Agent, or Firm* — Lee & Morse, P.C.

(57) ABSTRACT

A rechargeable battery including an electrode assembly; a case accommodating the electrode assembly; a cap plate sealing the case, the cap plate including a vent hole for discharge of gas; and a safety vent at the vent hole, wherein the safety vent includes main groove at a center thereof; and sub groove around the main groove.

14 Claims, 5 Drawing Sheets

RECHARGEABLE BATTERY

BACKGROUND

1. Field

Embodiments relate to a rechargeable battery.

2. Description of the Related Art

A rechargeable battery is chargeable and dischargeable, unlike a primary battery. Such a rechargeable battery may be used to power small portable electronic devices, e.g., a mobile phone and a camcorder, when in the form of a low-capacity battery including a single packaged battery cell. When in the form of a high-capacity battery as a battery pack unit in which, e.g., tens, of battery packs are connected, the rechargeable battery may be used as a power source for, e.g., driving a motor for a hybrid vehicle and the like.

If the rechargeable battery is overcharged, gas may be generated, thereby increasing an internal pressure of the rechargeable battery. Thus, expansion and explosion of the rechargeable battery may occur. A safety vent may be included to discharge the gas generated in the rechargeable battery.

SUMMARY

Embodiments are directed to a rechargeable battery.

At least one of the above and other features and advantages may be realized by providing a rechargeable battery including an electrode assembly; a case accommodating the electrode assembly; a cap plate sealing the case, the cap plate including a vent hole for discharge of gas and a safety vent at the vent hole, wherein the safety vent includes main groove at a center thereof; and sub groove around the main groove.

The safety vent may include a first region at a peripheral part of the safety vent, the first region being coupled to the cap plate; and a second region at an inner part of the safety vent, wherein the main groove and the sub groove are in the second region.

The second region may have an upwardly convex shape.

The second region may have a thickness smaller than a thickness of the first region.

The sub groove may have a depth smaller than a depth of the main groove.

The main groove may include a first main groove transversely formed in the center of the safety vent; a second main groove extending from one end of the first main groove toward a peripheral part of the safety vent; and a third main groove extending from another end of the first main groove toward the peripheral part of the safety vent.

The second main groove and the third main groove may each have a "V" shape.

The sub groove may be substantially parallel with the first main groove.

The safety vent may include a plurality of sub grooves, the sub grooves being spaced from each other.

Each sub groove may have the configuration of a line in the form of a series of dashes, the sub grooves being aligned symmetrically to one another.

Each sub groove may have the configuration of a line in the form of a series of dashes, the sub grooves on respective sides of the first main groove being aligned to be offset from one another.

The sub groove may be substantially perpendicular to the first main groove.

The safety vent may include a plurality of sub grooves, the sub grooves being spaced from each other.

A set of sub grooves on one side of the first main groove may be symmetrical with another set of sub grooves on another side of the first main groove.

Each sub groove may have the configuration of a line in the form of a series of dashes, the sub grooves being aligned symmetrically to one another.

A set of sub grooves on one side of the first main groove may be offset from another set of sub grooves on another side of the first main groove.

Each sub groove may have the configuration of a line in the form of a series of dashes.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
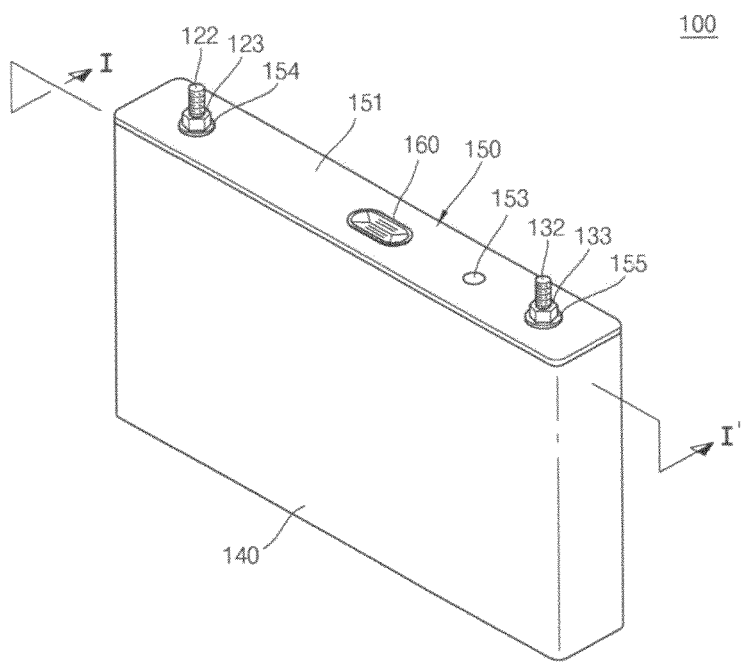
FIG. 1A illustrates a perspective view of a rechargeable battery according to an embodiment.

Korean Patent Application No. 10-2010-0070809 filed on Jul. 22, 2010, in the Korean Intellectual Property Office, and entitled: "Rechargeable Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1B:
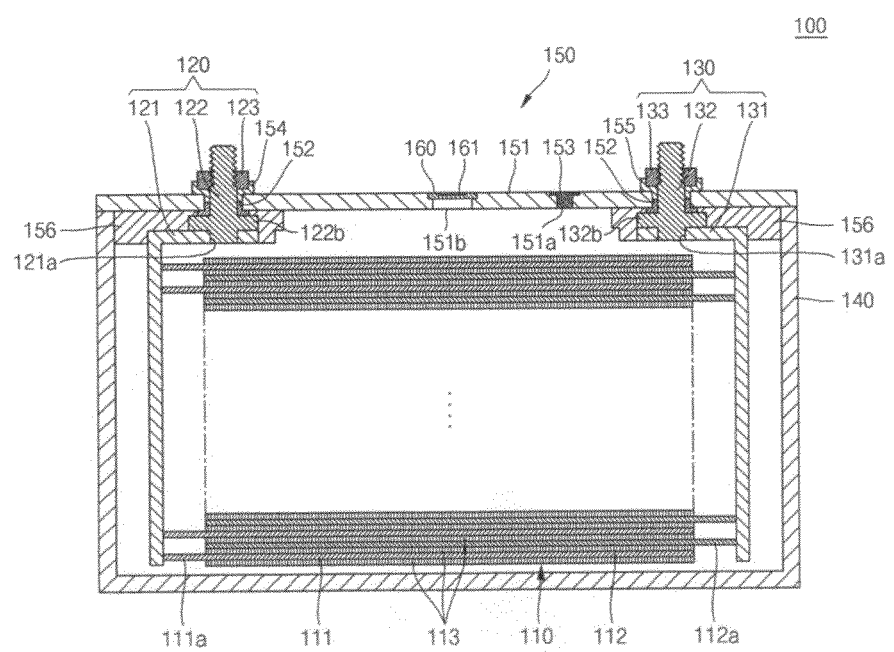
FIG. 1B illustrates a sectional view of FIG. 1A taken along a line I-I'.
Figure 1C:
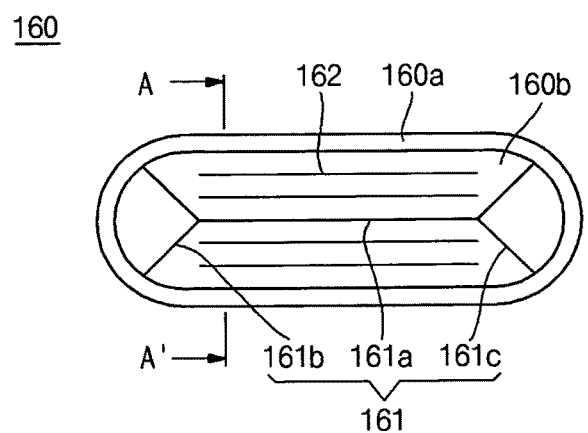
FIG. 1C illustrates a plan view of a safety vent of the rechargeable battery of FIG. 1A.
Figure 1D:
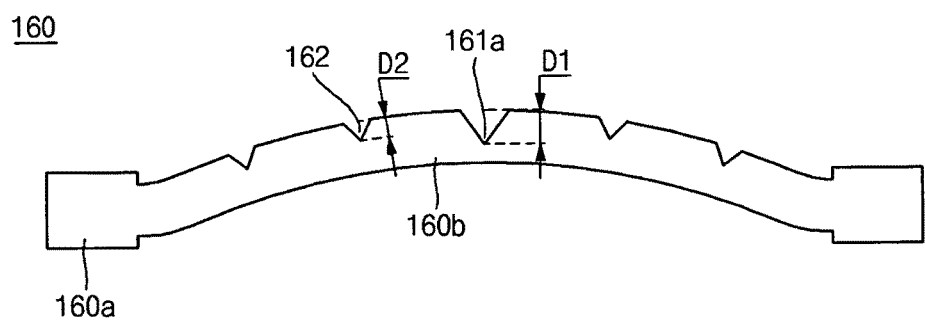
FIG. 1D illustrates a sectional view of FIG. 1C taken along a line A-A'.

FIG. 1A illustrates a perspective view of a rechargeable battery according to an embodiment. FIG. 1B illustrates a sectional view of FIG. 1A taken along a line I-I'. FIG. 1C illustrates a plan view of a safety vent of the rechargeable battery of FIG. 1A. FIG. 1D illustrates a sectional view of FIG. 1C taken along a line A-A'.

Referring to FIGS. 1A through 1D, a rechargeable battery 100 according to the present embodiment may include an electrode assembly 110, a first electrode terminal 120, a second electrode terminal 130, a case 140, a cap assembly 150, and a safety vent 160.

The electrode assembly 110 may be formed by winding or overlapping a first electrode plate 111, a separator 113, and a second electrode plate 112, which may be in the form of a thin plate or a film. In an implementation, the first electrode plate 111 may serve as a cathode while the second electrode plate 112 may serve as an anode.

The first electrode plate 111 may be formed by applying a first electrode active material, e.g., graphite or carbon, to a first electrode collector made of a metal foil, e.g., a nickel (Ni) or copper (Cu) foil. The first electrode plate 111 may include a first electrode non-coating portion 111a where the first electrode active material is not applied. The first electrode non-coating portion 111a may serve as a current path between the first electrode plate 111 and an outside of the first electrode plate 111. The material of the first electrode plate is not specifically limited.

The second electrode plate 112 may be formed by applying a second electrode active material, e.g., a transition metal oxide, to a second electrode collector made of a metal foil, e.g., an aluminum (Al) foil. The second electrode plate 112 may include a second electrode non-coating portion 112a where the second electrode active material is not applied. The second electrode non-coating portion 112a may serve as a current path between the second electrode plate 112 and an outside of the second electrode plate 112. Also, the material of the second electrode plate 112 is not specifically limited.

Polarities of the first electrode plate 111 and the second electrode plate 112 may be reversed.

The separator 113 may be disposed between the first electrode plate 111 and the second electrode plate 112 to prevent a short circuit and to facilitate transfer of lithium (Li) ions. The separator 113 may include, e.g., a polyethylene film, a polypropylene film, or a composite film of polyethylene and polypropylene. However, the material of the separator 113 is not specifically limited.

A first electrode terminal 120 and a second electrode terminal 130 may be connected to ends of the electrode assembly 110 to be electrically connected with the first electrode plate 111 and the second electrode plate 112, respectively.

The electrode assembly 110 may be received or accommodated in the case 140 along with an electrolyte. The electrolyte may include an organic solvent, e.g., EC, PC, DEC, EMC, and/or DMC, and a Li salt, e.g., $LiPF_6$ and/or $LiBF_4$. The electrolyte may be liquid, solid, or gel.

The first electrode terminal 120 may be made of a conductive material, e.g., Cu, and may be electrically connected with the first electrode plate 111. The first electrode terminal 120 may include a first collector plate 121, a first terminal body 122, and a first terminal nut 123.

The first collector plate 121 may contact the first electrode non-coating portion 111a at one end of the electrode assembly 110. The first collector plate 121 may have an "L" shape and may include a terminal hole 121a at an upper part thereof. The first terminal body 122 may be inserted in and engaged with the first terminal hole 121a.

The first terminal body 122 may be electrically connected with the first collector plate 121 by penetrating the cap plate 151, as will be described below. The first terminal body 122 may have a pole shape. The first terminal body 122 may include a screw thread 122a at an upper part thereof and a flange 122b at a lower part thereof to prevent separation from the cap plate 151. The lower part of the first terminal body 122 may be inserted in the first terminal hole 121a of the first collector plate 121. In an implementation, the first terminal body 122 may be electrically insulated from the cap plate 151.

The second electrode terminal 130 may be made of a conductive material, e.g., Al, and may be electrically connected with the second electrode plate 112. The second electrode terminal 130 may include a second collector plate 131, a second terminal body 132, and a second terminal nut 133.

The second collector plate 131 may contact the second electrode non-coating portion 112a at another end of the electrode assembly 110. The second collector plate 131 may have an "L" shape and may include a terminal hole 131a at an upper part thereof. The second terminal body 132 may be inserted in and engaged with the second terminal hole 131a.

The second terminal body 132 may be electrically connected with the second collector plate 131 by penetrating the cap plate 151, as will be described below. The second terminal body 132 may include a screw thread 132a at an upper part thereof and a flange 132b at a lower part thereof to prevent separation from the cap plate 151. The lower part of the second terminal body 132 may be inserted in the terminal hole 131a of the second collector plate 131. In an implementation, the second terminal body 132 may be electrically insulated from the cap plate 151.

The case 140 may be made of a conductive metal, e.g., Al, an Al alloy, and/or Ni-plated steel. The case 140 may have a substantially hexahedral shape including an opening to receive the electrode assembly 110 and/or the first electrode terminal 120 and the second electrode terminal 130. An inner surface of the case 140 may be treated to be insulated from the electrode assembly 110, the first electrode terminal 120, the second electrode terminal 130, and the cap assembly 150. The case 140 may serve as an electrode, e.g., as an anode.

The cap assembly 150 may be connected to the case 140. The cap assembly 150 may include a cap plate 151, a gasket 152, a stopper 153, an upper insulation member 154, a connection member 155, and a lower insulation member 156.

The cap plate 151 may seal the opening of the case 140 and may be made of the same material as the case 140. In an implementation, the cap plate 151 may have the same polarity as the case 140. The first electrode terminal 120 may be connected with one side of the cap plate 151 in a penetrating manner while the second electrode terminal 130 may be connected with another side of the cap plate 151 in a penetrating manner. Additionally, the cap plate 151 may include an electrolyte injection hole 151a to inject the electrolyte therethrough and a vent hole 151b to discharge gas generated inside of the rechargeable battery 100.

The gasket 152, which may be made of an insulating material, may be disposed between each of the first and the second terminal bodies 122 and 132 and the cap plate 151, thereby sealing gaps between each of the first and the second terminal bodies 122 and 132 and the cap plate 151. The gasket 152 may prevent infiltration of moisture from the outside into the rechargeable battery 100 and/or leakage of the electrolyte from inside the rechargeable battery 100.

The stopper 153 may be connected to the electrolyte inlet 151a in the cap plate 151. After the electrolyte is injected through the electrolyte inlet 151a, the stopper 153 may seal the electrolyte inlet 151a.

The upper insulation member 154 may fit around the first terminal body 122 between the first terminal body 122 and the cap plate 151. The upper insulation member 154 may closely contact the cap plate 151 and the gasket 152 around the first terminal body 122. Additionally, the upper insulation member 154 may insulate the first terminal body 122 from the cap plate 151.

The connection member 155 may fit around the second terminal body 132 between the second terminal body 132 and the cap plate 151. The connection member 155 may closely contact the cap plate 151 and the gasket 152 around the second terminal body 133. The connection member 155 may electrically connect the second terminal body 132 and the cap plate 151.

The lower insulation member 156 may be disposed between each of the first and the second collector plate 121 and 131 and the cap plate 151 so as to prevent undesirable short circuits.

The safety vent 160 may be disposed at the vent hole 151b of the cap plate 151. For example, the safety vent 160 may be formed larger than the vent hole 151b. The safety vent 160 may have a thickness smaller than a thickness of the cap plate 151. The safety vent 160 may close the vent hole 151b during normal operation of the rechargeable battery 100. If an excessive amount of gas is generated in the rechargeable battery 100, the safety vent 160 may be broken or opened to discharge the gas outside of the rechargeable battery 100. The safety vent 160 may be welded to the cap plate 151, e.g., by laser welding or resistance welding, although the embodiments are not limited thereto.

The safety vent 160 may be divided into a first region 160a and a second region 160b.

The first region 160a may correspond to a peripheral part of the safety vent 160 and may be fixed or coupled to the cap plate 151. For example, the first region 160a may be welded to the cap plate 151. The first region 160a may be relatively thicker than the second region 160b to securely fix or couple the safety vent 160 to the cap plate 151.

The second region 160b may be disposed at an inner part of the safety vent 160 relative to the first region 160a. If an excessive amount of gas is generated in the rechargeable battery 100, the second region 160b may be swollen by pressure of the gas. For example, the second region 160b may have a thickness smaller than a thickness of the first region 160a. In addition, the second region 160a may have an upward convex shape capable of enduring an increase in the internal pressure caused by the gas generated in the rechargeable battery 100.

The second region 160b may include a main groove 161 and a sub groove 162.

The main groove 161 may include a first main groove 161a, a second main groove 161b, and a third main groove 161 c. The main groove 161 may be disposed in a center of the second region 160a, e.g., a center of the safety vent 160. If the internal pressure of the rechargeable battery 100 exceeds a predetermined pressure, the main groove 161 may be broken.

The first main groove 161a may be transversely formed in the center of the safety vent 160. The second main groove 161b may extend in a "V" shape from one end of the first main groove 161a toward the peripheral part of the safety vent 160. The third main groove 161c may extend in a "V" shape from another end of the first main groove 161 a toward the peripheral part of the safety vent 160. For example, the second and the third main grooves 161b and 161c may symmetrically extend from respective ends of the first main groove 161a toward the first region 160a of the safety vent 160.

The sub groove 162 may be formed around the main groove 161. The safety vent 160 may include a plurality of sub grooves 162, e.g., the safety vent 160 may include at least two sub grooves 162. Each sub groove 162 may be disposed between the main groove 161 and the peripheral part of the safety vent 160. For example, each sub groove 162 may be disposed in the second region 160b between the first main groove 161a and the first region 160a. The sub grooves 162 may be formed on both sides of the first main groove 161a, and an explanation will be made with respect to one of the sub grooves 162.

Referring to FIGS. 1C and 1D, the sub grooves 162 may be arranged substantially parallel with the first main groove 161 a and may be spaced from the first main groove 161a. As illustrated in FIG. 1C, four sub grooves 162 may be included in the safety vent 160, however, the embodiments are not limited thereto. For example, one, two, or more sub grooves 162 may be included. The sub groove 162 may be formed at a predetermined interval from the first main groove 161 and may have a linear shape. A depth D2 of the sub groove 162 may be smaller than a depth D1 of the main groove 161 (D1>D2).

When the sub grooves 162 are formed around the main groove 161, peripheral parts of the sub grooves 162 may be raised convexly. For example, as the sub grooves 162 are formed around the main groove 161, the second region 160b may become convex upward as a whole, accordingly increasing a modulus of elasticity of the safety vent 160.

As mentioned above, when the sub grooves 162 are formed in the second region 160b of the safety vent 160, the second region 160b may become convex upward and stiffness of the safety vent 160 may increase. Accordingly, the safety vent 160 may swell slightly when the internal pressure is lower than the predetermined pressure and may operate or open when the internal pressure is greater than the predetermined pressure. Thus, reliability of the rechargeable battery 100 may be improved.

Figure 2:
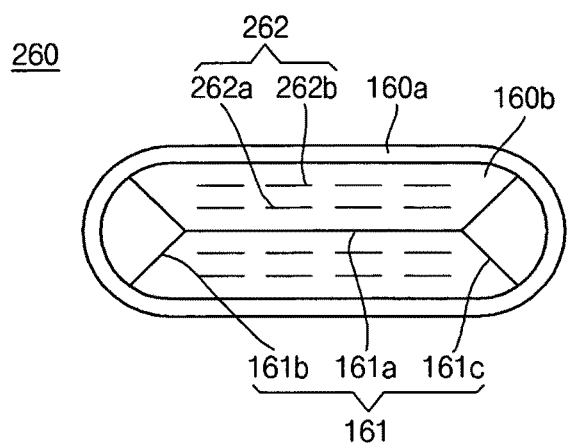
FIG. 2 illustrates a plan view of a safety vent according to another embodiment.

FIG. 2 illustrates a plan view of a safety vent according to another embodiment.

Referring to FIG. 2, the safety vent 260 may be divided into the first region 160a and the second region 160b. The second region 160b may include the main groove 161 and at least one sub groove 262. The sub grooves 262 may be provided on sides of the first main groove 161a and an explanation will be made with respect to one of the sub grooves 262.

The sub groove 262 may be disposed substantially parallel with the first main groove 161a and may be spaced from the first main groove 161a. For example, a plurality of sub grooves 262 may be arranged in the form of a dotted or dashed line at a predetermined interval from the first main groove 161a. As illustrated in FIG. 2, four sub grooves 262 may be included, however the embodiments not limited thereto; and the number of sub grooves 262 may be varied.

In addition, the sub groove 262 may be arranged in, e.g., two, rows at intervals from the first main groove 161a. For a convenient explanation, the sub groove 262 in a first row from the first main groove 161 a will be referred to as a first sub groove 262a and the sub groove 262 in a second row will be referred to as a second sub groove 262b. The first and the second sub grooves 262a and 262b may be arranged symmetrically with each other. In addition, the first and the second sub grooves 262a and 262b may be provided on opposing sides of the first main groove 161a symmetrically with each other. Each sub groove may have the configuration of a line in the form of a series of dashes.

Figure 3:
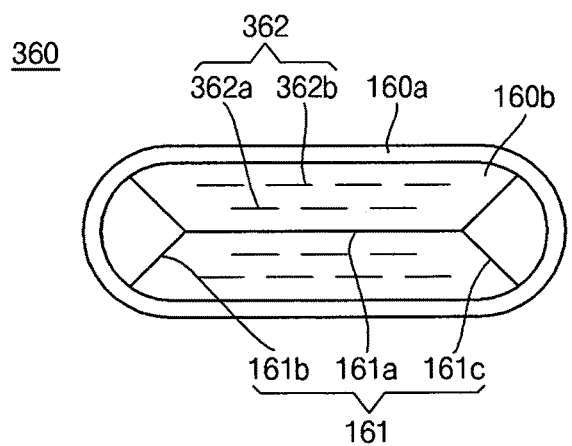
FIG. 3 illustrates a plan view of a safety vent according to yet another embodiment.

FIG. 3 illustrates a plan view of a safety vent according to yet another embodiment.

Referring to FIG. 3, the safety vent 360 may be divided into the first region 160a and the second region 160b. The second region 160b may include the main groove 161 and at least one sub groove 362. The sub grooves 362 may be provided on sides of the first main groove 161a and an explanation will be made with respect to one of the sub grooves 362.

The sub groove 362 may be disposed substantially parallel with the first main groove 161a and may be spaced from the first main groove 161a. For example, a plurality of the sub grooves 362 may be may have the configuration of a line in the form of a series of dashes at a predetermined interval from the first main groove 161a.

In addition, the sub groove 362 may be arranged in, e.g., two, rows at intervals from the first main groove 161a. For a convenient explanation, the sub groove 362 in a first row from the first main groove 161a will be referred to as a first sub groove 362a and the sub groove 362 in a second row will be referred to as a second sub groove 362b. The first and the second sub grooves 362a and 362b may be arranged alternately or offset from one another, rather than symmetrically.

Figure 4:
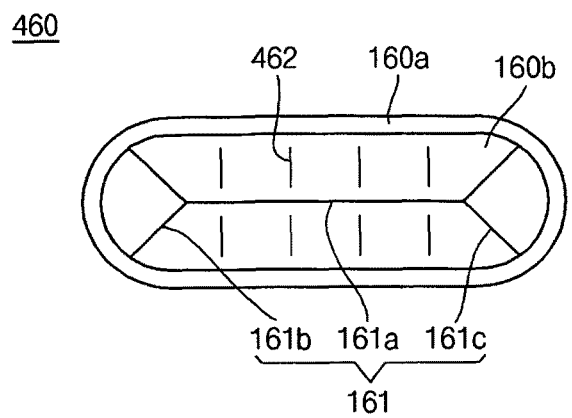
FIG. 4 illustrates a plan view of a safety vent according to still another embodiment.

FIG. 4 illustrates a plan view of a safety vent according to still another embodiment.

Referring to FIG. 4, the safety vent 460 may be divided into the first region 160a and the second region 160b. The second region 160b may include the main groove 161 and at least one sub groove 462.

The sub groove 462 may be formed substantially perpendicular to the first main groove 161a and may be spaced from the first main groove 161a. As illustrated in FIG. 4, the sub grooves 462 may be formed at predetermined intervals from the first main groove 161a. However, the embodiments are not limited thereto; and the arrangement of sub groove 462 may be varied.

In addition, the sub groove 462 may be provided on opposing sides of the first main groove 161a symmetrically with each other. In other words, one set of sub grooves on one side of the first main groove may be symmetrical with another set of sub grooves on another side of the first main groove.

Figure 5:
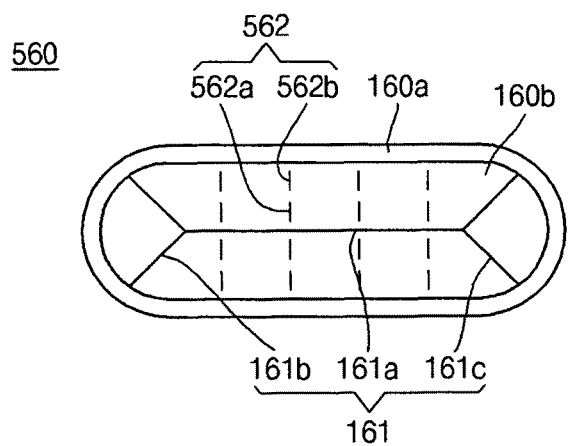
FIG. 5 illustrates a plan view of a safety vent according to still another embodiment.

FIG. 5 illustrates a plan view of a safety vent according to yet another embodiment.

Referring to FIG. 5, the safety vent 560 may be divided into the first region 160a and the second region 160b. The second region 160b may include the main groove 161 and at least one sub groove 562. The sub groove 562 may be provided on sides of the first main groove 161a and an explanation will be made with respect to one of the sub grooves 562.

The sub groove 562 may be formed substantially perpendicular to the first main groove 161a and may be spaced from the first main groove 161a. Also, the sub groove 562 may be arranged in, e.g., two, rows at intervals from the first main groove 161a. In other words, the sub grooves 562 may has have the configuration of a line in the form of a series of dashes. For a convenient explanation, the sub groove 562 in a first row from the first main groove 161a will be referred to as a first sub groove 562a and the sub groove 562 in a second row will be referred to as a second sub groove 562b. The first and the second sub grooves 562a and 562b may be arranged symmetrically with each other. In addition, the first and the second sub grooves 562a and 562b may be provided on opposing sides of the first main groove 161a symmetrically with each other.

Figure 6:
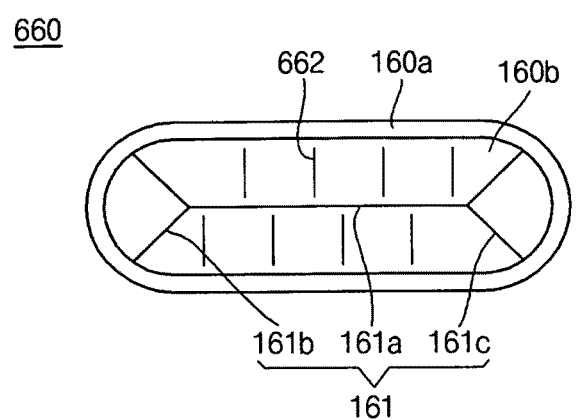
FIG. 6 illustrates a plan view of a safety vent according to still another embodiment.

FIG. 6 illustrates a plan view of a safety vent according to yet another embodiment.

Referring to FIG. 6, the safety vent 660 may be divided into the first region 161a and the second region 161b. The second region 161b may include the main groove 161 and at least one sub groove 662.

The sub groove 662 may be formed substantially perpendicular to the first main groove 161a and may be spaced from the first main groove 161a. As illustrated in FIG. 6, four sub grooves 662 may be formed at a predetermined interval from the first main groove 161a, however, the embodiments are not limited thereto; and the number of sub groove 662 may be varied.

In addition, the sub grooves 662 on opposing sides of the first main groove 161a may be arranged alternately or offset from one another, rather than symmetrically. In other words, one set of sub grooves on one side of the first main groove may be offset from another set of sub grooves on another side of the first main groove. In an implementation, the sub grooves 662 may have the configuration of a line in the form of a series of dashes.

According to the embodiments, a sub groove may be formed at a second region of a safety vent, thereby increasing stiffness of the safety vent. Therefore, in the rechargeable battery according to the embodiments, slight swelling of the safety vent may occur when the safety vent has an internal pressure lower than a predetermined pressure. On the other hand, the safety vent may operate or open when the internal pressure exceeds the predetermined pressure. As a result, reliability of the rechargeable battery may be improved.

According to the embodiments, even though the safety vent may swell according to the internal pressure of the rechargeable battery, cracking caused by repeated swelling may be prevented. In addition, a reduction in operational voltage of the safety vent due to the repeated swelling may be avoided.

The embodiments provide a rechargeable battery having a safety vent with improved stiffness by including a sub groove on the safety vent.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A rechargeable battery, comprising:
an electrode assembly;
a case accommodating the electrode assembly;
a cap plate sealing the case, the cap plate including a vent hole for discharge of gas and a safety vent at the vent hole,
wherein the safety vent includes:
a main groove at a center thereof;
a sub groove entirely spaced apart from and around the main groove,
a first region at a peripheral part of the safety vent, the first region being coupled to the cap plate; and
a second region at an inner part of the safety vent, and
wherein the main groove and the sub groove are in the second region,
wherein the main groove includes:
a first main groove transversely formed in the center of the safety vent;
a second main groove extending from one end of the first main groove toward a peripheral part of the safety vent; and
a third main groove extending from another end of the first main groove toward the peripheral part of the safety vent, and
wherein the sub groove is substantially parallel with the first main groove.

2. The rechargeable battery as claimed in claim 1, wherein the second region has an upwardly convex shape.

3. The rechargeable battery as claimed in claim 1, wherein the second region has a thickness smaller than a thickness of the first region.

4. The rechargeable battery as claimed in claim 1, wherein the sub groove has a depth smaller than a depth of the main groove.

5. The rechargeable battery as claimed in claim 1, wherein the second main groove and the third main groove each have a "V" shape.

6. The rechargeable battery as claimed in claim 1, wherein the safety vent includes a plurality of sub grooves, the sub grooves being spaced from each other.

7. The rechargeable battery as claimed in claim 6, wherein each sub groove has the configuration of a line in the form of a series of dashes, the sub grooves being aligned symmetrically to one another.

8. The rechargeable battery as claimed in claim 6, wherein each sub groove has the configuration of a line in the form of a series of dashes, the sub grooves on respective sides of the first main groove being aligned to be offset from one another.

9. The rechargeable battery as claimed in claim 1, wherein the sub groove is substantially perpendicular to the first main groove.

10. The rechargeable battery as claimed in claim 9, wherein the safety vent includes a plurality of sub grooves, the sub grooves being spaced from each other.

11. The rechargeable battery as claimed in claim 10, wherein a set of sub grooves on one side of the first main groove are symmetrical with another set of sub grooves on another side of the first main groove.

12. The rechargeable battery as claimed in claim 11, wherein each sub groove has the configuration of a line in the form of a series of dashes, the sub grooves being aligned symmetrically to one another.

13. The rechargeable battery as claimed in claim 10, wherein a set of sub grooves on one side of the first main groove are offset from another set of sub grooves on another side of the first main groove.

14. The rechargeable battery as claimed in claim 13, wherein each sub groove has the configuration of a line in the form of a series of dashes.

* * * * *